316-10
FIP8502 XR 3,544,867 SR

M. GREEN 3,544,867

ACOUSTIC TRANSDUCER WITH HALL EFFECT FEEDBACK

Filed Nov. 7, 1969 2 Sheets-Sheet 1

INVENTOR.
MILTON GREEN
BY Ernest F. Weinberger
ATTORNEYS

INVENTOR.
MILTON GREEN
BY Ernest F. Weinberger
Louis B. Applebaum
ATTORNEYS

United States Patent Office 3,544,867

Patented Dec. 1, 1970

3,544,867
ACOUSTIC TRANSDUCER WITH HALL EFFECT FEEDBACK

Milton Green, Mystic, Conn., assignor to the United States of America as represented by the Secretary of the Navy Filed Nov. 7, 1969, Ser. No. 874,738
Int. Cl. H01v 9/00
U.S. Cl. 318—118 6 Claims

ABSTRACT OF THE DISCLOSURE

A magnetostrictive transducer wherein an oscillatory current is applied to the winding of a magnetostrictive core which in turn is magnetically coupled to a Hall generator. The output derived from the Hall generator is in series with the winding and thereby provides a feedback loop for sustaining a specific low frequency.

The invention described herein may be manufactured and used by or for the Government of the United States of America for governmental purposes without the payment of any royalties thereon or therefor.

BACKGROUND OF THE INVENTION

Field of the invention

The present invention relates to an acoustic transducer and more particularly to a magnetostrictive transducer wherein a Hall-effect circuit arrangement is employed through a feedback network to provide an oscillatory current for the field coil and thus activate the magnetostrictive element.

Description of the prior art

In the field of magnetostrictive transducers, it has been the general practice to employ external electrical oscillators to drive the vibratory element. These oscillators supply an A.C. signal which is derived from a power supply. Such devices have been unsatisfactory in that they require extensive external equipment and cannot be fabricated in a portable form.

SUMMARY OF THE INVENTION

The general purpose of this invention is to provide an oscillator in combination with a magnetostrictive transducer that has all the advantages of similarly employed prior art devices and has none of the above described disadvantages. To attain this, the present invention provides a unique Hall-effect oscillator in which the Hall element is both electrically and magnetically coupled to the active element so as to provide a complete feedback loop. The energy source for the mganetostrictive transducer consists essentially of a battery or any other D.C. source.

An object of this invention is to provide a simple, reliable and inexpensive portable magnetostrictive transducer.

Another object is to provide a unique coupling arrangement between the active transducer and the Hall-effect generator.

Still another object is to provide a magnetostrictive transducer which is supplied directly by a D.C. source and which is portable.

Other objects and many of the attendant advantages of this invention will be readily appreciated as the same becomes better understood by reference to the following detailed description when considered in connection with the accompanying drawings.

BRIEF DESCRIPTION OF THE PREFERRED EMBODIMENT

Figures 1, 1A:
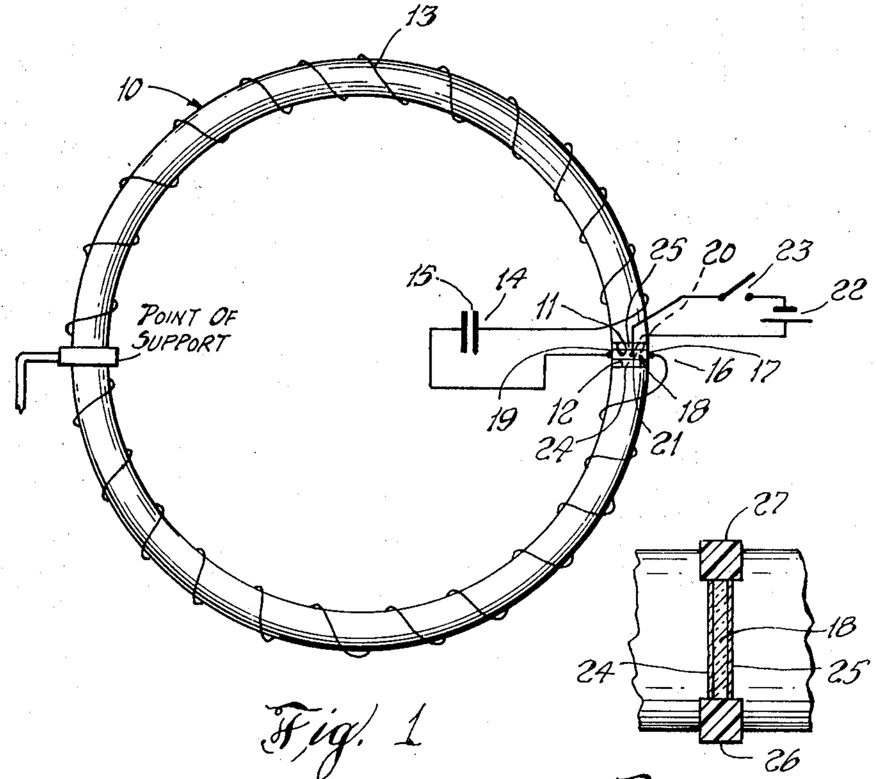
FIG. 1 is a partial perspective and schematic diagram of a transducer made in accordance with the principle of this invention.
FIG. 1*a* illustrates the spacers for the gap.

In the illustrated embodiment of FIG. 1, a hollow cylinder (in cross-section) is formed into a ring or core 10 whose end faces 11 and 12 are separated by an air gap. The core is fabricated of a magnetostrictive material so as to comprise the active transducer element. (Many suitable magnetostrictive materials are commercially available although annealed nickel has proved quite satisfactory.) Helically wound about the core 10 is a coil winding 13 whose one end 14 terminates at capacitor 15 while the other end 16 terminates on one edge face 17 of the Hall-effect element 18. The opposite face 19 of the element 18 is connected to the free end of capacitor 15. Connected across the other two edge faces (of element 18) 20 and 21 is a battery 22 in series with switch 23 completing this circuit. Since the Hall-effect element is disposed in the core gap and the gap spacing minimized, the faces thereof are each provided with a thin layer of an electrical insulator 24 and 25 such as Mylar or Teflon. It is advisable however, to provide protection to prevent crushing of the Hall-element. For this purpose a pair of spacers 26 and 27 are provided as in FIG. 1*a* on the outside between the ends and in the gap.

Figure 2:
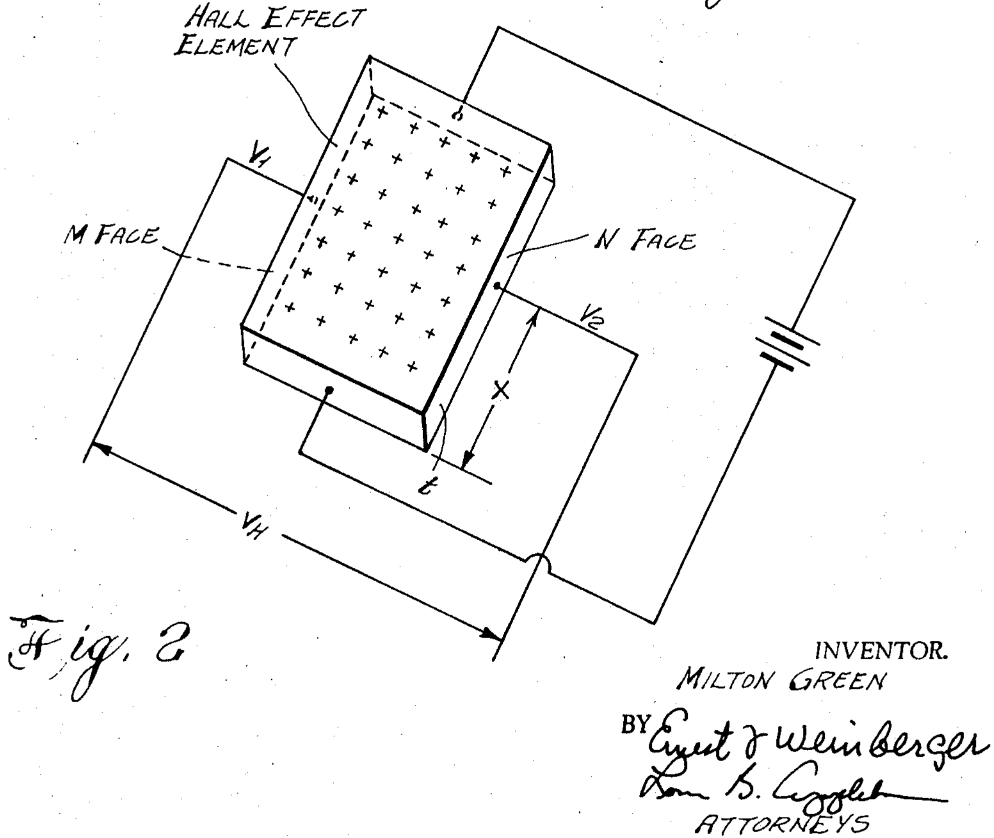
FIG. 2 illustrates a typical Hall element with the electrical connections made thereto.
Figure 3:
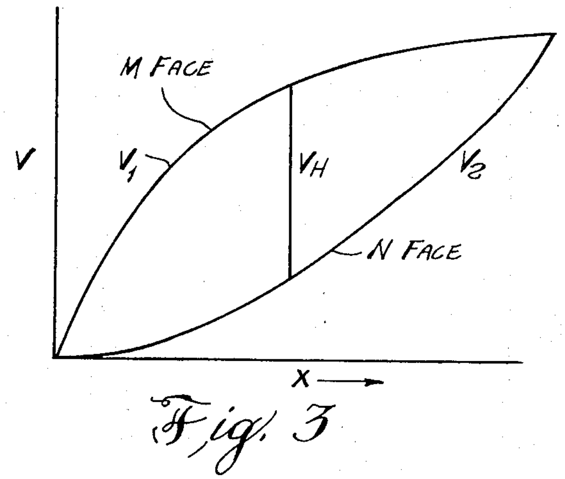
FIG. 3 is a graphical plot of the voltages along the faces of the Hall element.

The Hall-effect generator element is illustrated in FIG. 2, where a battery is connected across opposite edge faces thereof while the other edge faces M and N provide an output voltage (Hall-effect voltage) $V_H$ thereacross. This voltage $V_H$ is the potential difference between the absolute potentials on each of the faces M and N as illustrated in FIG. 3, and is dependent on the magnetic field passing through the element perpendicularly to the current induced by the battery. Generally, the Hall generator is a four-terminal active device such that when current is passed therethrough, a magnetic field passes through the element in a direction normal thereto (current) a voltage is generated ($V_H$) across the opposite edge faces. The magnitude and the direction of this voltage $V_H$ is determined by the equation:

$$V_H = R_H \frac{I \times B(10^{-8})}{t} \text{ in volts}$$

where $R_H$ is a material constant
where I and B are the current and magnetic field vectors
while $t$ is the thickness of the element.

It is assumed that the coil 13 is wound with the proper number of turns so that its inductance in combination with the capacitance of the condenser will form a resonant circuit at one-half the mechanical resonant frequency of the core 10 and under these conditions for electrical oscillation is:

$$I \geq \frac{m}{M} \frac{ic}{(\phi)} (\Delta y)^2 \times 10^8 \text{ amps}$$

where I is the D.C. input to the element
where $m$ is a number generally between 2 and 20 and depends on the loading (acoustical and electrical) and the losses in the output circuit,
where $ic/\phi$ is the magnetic reluctance of the magnectic coil,
where $\Delta y$ is the dimension of the Hall-generator parallel to the output terminals, and
where M is the mobility of the charge carrier of the Hall element. For N-type indium antimonide, M may be as high as $8 \times 10^5$ cm.$^2$/voltsec. at room temperature and even greater at lower temperatures. For N-type InAs, M may be as high as $3 \times 10^5$ cm.$^2$/voltsec.

It is obvious from the above equation that the larger the value of M the smaller the input current necessary for sustained oscillations. Referring to FIG. 3 it is clear for the purpose of initiating the oscillation, the output terminals on the M- and N-faces of the Hall element, though centrally located, are slightly displaced so that they *both* do *not* lie on the *same* equipotential surface when the magnetic field is not present. This small voltage will produce a small current to flow in the coil winding 13, thereby generating a small magnetic field B across the gap of the core and through the Hall-effect element. By providing positive feedback, namely, having the residual voltage (no field) and the Hall voltage (dependent on B) act in the same direction, the coil current will increase until the capacitor is fully charged, at which time it will discharge and reverse the current, thereby reducing it toward zero. Thereafter, the capacitor will be discharged and the cycle will start again so as to produce a sinusoidal electrical oscillation.

The magnetostriction causes the core to shrink or expand (dependent on material) proportionally to the magnetic flux in the core, and hence the two ends at the gap containing the Hall-generator will oscillate toward and away from one another at twice the frequency of the electric oscillation of the circuit. The magnetic core has inherent or structural natural frequencies of oscillation and when the electric oscillation frequency is one-half thereof, considerable electrical energy from the battery will be converted into acoustical energy. This is particularly true where the resonant mechanical frequency is the fundamental mode. The magnetic core is supported at the point diametrically opposite the gap, since this point of support is a node, and the core will oscillate as a tuning fork.

The back-E.M.F. resulting from a current $i$ flowing in in the Hall-generator output circuit is proportional to the product $ixB$, which, since $Bxi$ is proportional to $i^2$ and since $i(\theta)=i_0 \sin (wt-\theta)$, then $E_{back}=Ki_0^2 \sin^2 (wt-\theta)$ where K is a constant and $w$ is the angular frequency of the oscillator and $\theta$ is the phase constant. Hence, the input D.C. power supply sees a D.C. component and an A.C. component of angular frequency $2\omega$. If the power source were to drive two identical Hall generators in series, having the same identical frequency but shifted by 90°, then the supply would see a constant D.C. back-E.M.F. of:

$$E_{0^\circ}+E_{90^\circ}=Ki_{02}^2 (\sin wt-\theta)^2+Ki_0^2 \cos (wt-\theta)^2=Ki_0^2$$

Figure 4:
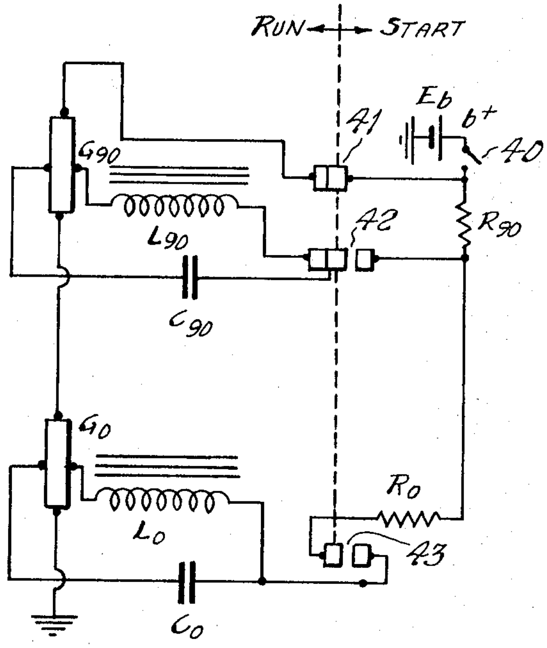
FIG. 4 is a schematic diagram of a quadrature arrangement of two Hall generators.

A circuit arrangement for this purpose is shown in FIG. 4.

Initially switch 40 to the power supply is open. The start button is pushed to the start position actuating the ganged switches 41, 42, and 43 to the right. Then power switch 40 is closed charging capacitor $C_{90}$ to the voltage $E_b$ through the resistance $R_{90}$ and switch 42 and allowing the magnetic field in $L_0$ to build up by current flow through limiting resistor $R_0$, switch 40, coil $L_0$, and Hall-generator $G_0$ to ground. In this position, start, no input current flows through Hall-generators $G_{90}$ and $G_0$ as switch 41 is open. Thereafter, when the start button is switched to the run position, input current will flow serially through both Hall-generators, $G_{90}$ and $G_0$. The two oscillator circuits, indicated by the phase-angle 90° and 0°, will then be in the appropriate initial conditions to oscillate by 90° phase difference. This phase difference would continue as long as the two oscillators maintained the exact same frequency.

I claim:

1. A Hall-effect magnetostrictive transducer comprising:
   - an open circular ring core of a magnetostrictive material having an air gap between the ends thereof,
   - an electrical helical winding about said core,
   - a Hall-effect element having the shape of a parallelepiped disposed in said air gap,
   - a capacitor,
   - a first series electrical circuit having connected therein
     - said capacitor,
     - said coil,
     - a pair of opposite edge faces of said element,
   - a source of direct current, and
   - electrical means connecting said battery across a second pair of opposite edge faces of said element.

2. The transducer according to claim 1 further including an electrical switch connected between said battery and one of said second pair of faces.

3. The transducer according to claim 2 wherein said element is N type indium antimonide.

4. The transducer according to claim 3 further including insulators disposed intermediate said element and said ends of said core.

5. The transducer according to claim 4 wherein said insulators are sheets of Mylar.

6. The transducer according to claim 5 further including support means affixed to said core at a point diametrically opposite said gap.

References Cited

UNITED STATES PATENTS

| | | | |
|---|---|---|---|
| 1,778,795 | 10/1930 | Craig | 310—26 X |
| 1,811,126 | 6/1931 | Harrison | 318—118 X |
| 1,822,129 | 9/1931 | Craig | 310—26 X |
| 2,876,419 | 3/1959 | Gianola et al. | 307—309 X |
| 3,155,844 | 11/1964 | Auld | 307—309 X |

DONAVAN F. DUGGAN, Primary Examiner

U.S. Cl. X.R.

307—309; 310—10, 26